United States Patent
Bastide et al.

(10) Patent No.: US 10,158,592 B2
(45) Date of Patent: *Dec. 18, 2018

(54) SELECTIVELY UNMUTING ELECTRONIC MESSAGING CONVERSATIONS

(71) Applicant: International Business Machines Corporation, Armonk, NY (US)

(72) Inventors: Paul R. Bastide, Boxford, MA (US); Andrew E. Davis, Arlington, MA (US); Dan Dumont, Pepperell, MA (US); Lorelei M. McCollum, Somerville, MA (US); Eric S. Portner, Northborough, MA (US); Amanda N. Savitzky, Austin, TX (US); Asima Silva, Holden, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/785,429

(22) Filed: Oct. 17, 2017

(65) Prior Publication Data
US 2018/0041456 A1 Feb. 8, 2018

Related U.S. Application Data

(63) Continuation of application No. 14/733,243, filed on Jun. 8, 2015, now Pat. No. 9,935,906.

(51) Int. Cl.
*H04L 12/58* (2006.01)

(52) U.S. Cl.
CPC ............ *H04L 51/12* (2013.01); *H04L 51/16* (2013.01); *H04L 51/22* (2013.01)

(58) Field of Classification Search
CPC ......... H04L 51/12; H04L 51/22; H04L 51/16; H04L 51/63
(Continued)

(56) References Cited

U.S. PATENT DOCUMENTS 8,194,840 B2   6/2012  Anglin et al.
2006/0233183 A1* 10/2006 Soncodi ............ H04L 29/06027
                                                  370/401

(Continued)

OTHER PUBLICATIONS

IBM: List of IBM Patents or Patent Applications Treated as Related, 2 pg.
Bastide, P.R. et al., "Selectively Unmuting Electronic Messaging Conversations," U.S. Appl. No. 14/733,243, filed Jun. 8, 2015, 26 pages.
(Continued)

*Primary Examiner* — Tu T Nguyen
(74) *Attorney, Agent, or Firm* — Cuenot, Forsythe & Kim LLC

(57) ABSTRACT

A first user muting a conversation, taking place among a plurality of users using an exchange of electronic messages, can be detected. Responsive to the first user muting the conversation, an electronic message inbox of the first user can be configured to prevent further electronic messages pertaining to the conversation from being visible in the electronic message inbox. At least one additional electronic message pertaining to the conversation can be received. Responsive to receiving the additional electronic message pertaining to the conversation, the additional electronic message can be analyzed and, based on the analysis, whether the conversation should be unmuted for the first user can be automatically determined. Responsive to determining that the conversation should be unmuted for the first user, the electronic message inbox of the first user can be configured to make visible at least the additional electronic message.

20 Claims, 3 Drawing Sheets

(58) Field of Classification Search
USPC .......................................................... 709/206
See application file for complete search history.

(56) References Cited

U.S. PATENT DOCUMENTS

| | | |
|---|---|---|
| 2007/0180036 A1 | 8/2007 | Hebert et al. |
| 2009/0183096 A1 | 7/2009 | Edelen et al. |
| 2009/0273713 A1 | 11/2009 | Goldman |
| 2011/0092221 A1 | 4/2011 | Zubas |
| 2011/0307565 A1 | 12/2011 | Szady et al. |
| 2014/0288939 A1 | 9/2014 | Beaurepaire et al. |
| 2015/0140978 A1 | 5/2015 | Zilmer et al. |
| 2015/0163182 A1* | 6/2015 | Chandrasekaran ... H04L 51/063 709/204 |
| 2016/0241494 A1 | 8/2016 | Badge et al. |
| 2016/0359781 A1 | 12/2016 | Bastide et al. |

OTHER PUBLICATIONS

"Muting or Ignoring Conversations," [online] Gmail Help, Google, Inc. © 2015, [retrieved Jun. 3, 2015] retrieved from the Internet: <https://support.google.com/mail/answer/47787?hl=en>, 3 pg.

"IBM—SPSS Text Analytics for Surveys," [online] IBM Corporation, [retrieved Jun. 3, 2015] retrieved from the Internet: <http://www-03.ibm.com/software/products/en/spss-text-analytics-surveys>, 2 pg.

"IBM—SPSS Statistics," [online] IBM Corporation, [retrieved Jun. 3, 2015] retrieved from the Internet:<http://www-01.ibm.com/software/analytics/spss/products/statistics/>, 3 pg.

"Nataural Language Processing," [online] Wikipedia, the Free Encyclopedia, May 24, 2015, [retrieved Jun. 3, 2015] retrieved from the Internet: <http://en.wikipedia.org/wiki/Natural_language_processing>, 15 pg.

Rohall, S.L. et al., "ReMail: a Reinvented Email Prototype," In CHI '04 Extended Abstracts on Human Factors in Computing Systems (CHI EA '04), Apr. 24-29, 2004, ACM, pp. 791-792.

* cited by examiner

SELECTIVELY UNMUTING ELECTRONIC MESSAGING CONVERSATIONS

BACKGROUND

The present invention relates to electronic messaging systems.

Electronic mail (e-mail), text messaging and online social networks are used universally for people to connect with each other and share information in logical and organized ways. The most common mechanisms for sharing and processing information are e-mail systems, text messaging systems, social networking systems, activity streams, timelines and profiles. These mechanisms enable users to rapidly share information with others and gather information from others.

SUMMARY

A method includes, for a conversation taking place among a plurality of users using an exchange of electronic messages, detecting that at least a first user has muted the conversation. The method also includes, responsive to the first user muting the conversation, configuring an electronic message inbox of the first user to prevent further electronic messages pertaining to the conversation from being visible in the electronic message inbox. The method also includes receiving at least one additional electronic message pertaining to the conversation while the conversation is muted for the first user. The method also includes, responsive to receiving the additional electronic message pertaining to the conversation, analyzing at least the additional electronic message and, based on analyzing at least the additional electronic message, automatically determining, using a processor, whether the conversation should be unmuted for the first user. The method also includes, responsive to determining that the conversation should be unmuted for the first user, configuring the electronic message inbox of the first user to make visible at least the additional electronic message in the electronic message inbox of the first user.

A system includes a processor programmed to initiate executable operations. The executable operations include, for a conversation taking place among a plurality of users using an exchange of electronic messages, detecting that at least a first user has muted the conversation. The executable operations also include, responsive to the first user muting the conversation, configuring an electronic message inbox of the first user to prevent further electronic messages pertaining to the conversation from being visible in the electronic message inbox. The executable operations also include receiving at least one additional electronic message pertaining to the conversation while the conversation is muted for the first user. The executable operations also include, responsive to receiving the additional electronic message pertaining to the conversation, analyzing at least the additional electronic message and, based on analyzing at least the additional electronic message, automatically determining whether the conversation should be unmuted for the first user. The executable operations also include, responsive to determining that the conversation should be unmuted for the first user, configuring the electronic message inbox of the first user to make visible at least the additional electronic message in the electronic message inbox of the first user.

A computer program includes a computer readable storage medium having program code stored thereon. The program code is executable by a processor to perform a method. The method includes, for a conversation taking place among a plurality of users using an exchange of electronic messages, detecting, by the processor, that at least a first user has muted the conversation. The method also includes, responsive to the first user muting the conversation, configuring, by the processor, an electronic message inbox of the first user to prevent further electronic messages pertaining to the conversation from being visible in the electronic message inbox. The method also includes receiving, by the processor, at least one additional electronic message pertaining to the conversation while the conversation is muted for the first user. The method also includes, responsive to receiving the additional electronic message pertaining to the conversation, analyzing, by the processor, at least the additional electronic message and, based on analyzing at least the additional electronic message, automatically determining, by the processor, whether the conversation should be unmuted for the first user. The method also includes, responsive to determining that the conversation should be unmuted for the first user, configuring, by the processor, the electronic message inbox of the first user to make visible at least the additional electronic message in the electronic message inbox of the first user.

DETAILED DESCRIPTION

Figure 1:
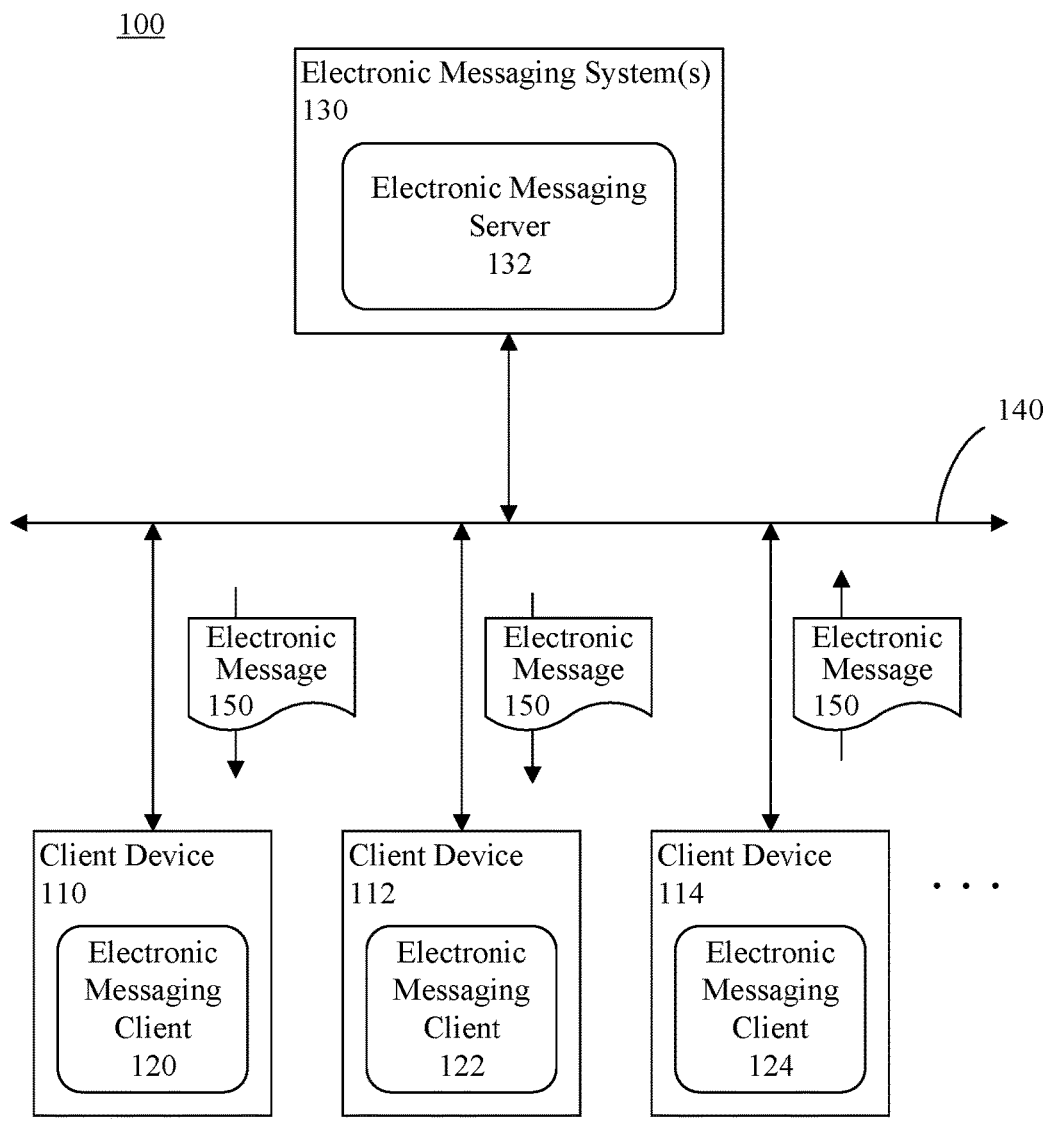
FIG. 1 is a block diagram illustrating an example of a communication system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to electronic messaging systems. Users oftentimes create, read and respond to countless electronic messages each day. To manage the flood of messages, users may mute a conversation or topic. When a conversation is muted, however, users may not be presented messages that may be important to the users. In accordance with the inventive arrangements disclosed herein, electronic messages exchanged in a conversation that has been muted by a user can be automatically analyzed to determine whether the conversation should be unmuted. A determination can be made to unmute the conversation, for example, if the analysis determines that one or more messages communicated in the conversation contains at least one term that is of particular interest to the user, or that one or more messages communicated in the conversation are generated by another user who is of particular interest to the user.

Several definitions that apply throughout this document now will be presented.

As defined herein, the term "mute" means to direct an electronic messaging to not display, or notify of, one or more received electronic messages.

As defined herein, the term "electronic message" means a message electronically communicated via an e-mail system, a text messaging system or a social networking system. An electronic message typically is text based, but may have as one or more attachments, or embedded within the electronic message, one or more still images, audio content, video content and/or audio/video content As defined herein, the term "conversation" means an exchange of a plurality of related electronic messages between at least two users.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or the like.

As defined herein, the term "automatically" means without user intervention.

As defined herein, the term "user" means a person (i.e., a human being).

FIG. 1 is a block diagram illustrating an example of a communication system (system) 100. The system 100 can include a plurality of client devices 110, 112, 114. Examples of client devices include, but are not limited to, a workstation, a desktop computer, a mobile computer, a laptop computer, a tablet computer, a smart phone, a personal digital assistant, a gaming device, a network appliance, and so on. Each client device 110-114 can include, or otherwise access, an electronic messaging client 120, 122, 124, which can be implemented using program code executable by a processor. In illustration, the client devices 110-114 can execute an e-mail messaging client, a text messaging client or a mobile application via which electronic messages are exchanged. In another arrangement, the client devices 110-114 can execute a web browser or other application to access a web-based e-mail messaging client, a web-based text messaging client or another web-based application and/or system via which electronic messages are exchanged.

Each of the client devices 110-114 can be communicatively linked to one or more electronic messaging systems 130, for example an e-mail system, a text messaging system or a social networking system, via which electronic messages are exchanged among users. Each electronic messaging system 130 can include at least one electronic messaging server 132 (e.g., an e-mail server, a text messaging server, a web-based electronic messaging application, etc.) configured to manage communication and receipt of electronic messages.

The client devices 110-114 can be communicatively linked to the electronic messaging system(s) 130 via at least one network 140. The network 140 is the medium used to provide communications links between various devices and data processing systems connected together within the system 100. The network 140 may include connections, such as wire, wireless communication links, or fiber optic cables. The network 140 can be implemented as, or include, any of a variety of different communication technologies such as a WAN, a LAN, a wireless network, a mobile network, a Virtual Private Network (VPN), the Internet, the Public Switched Telephone Network (PSTN), or the like.

Figure 2:
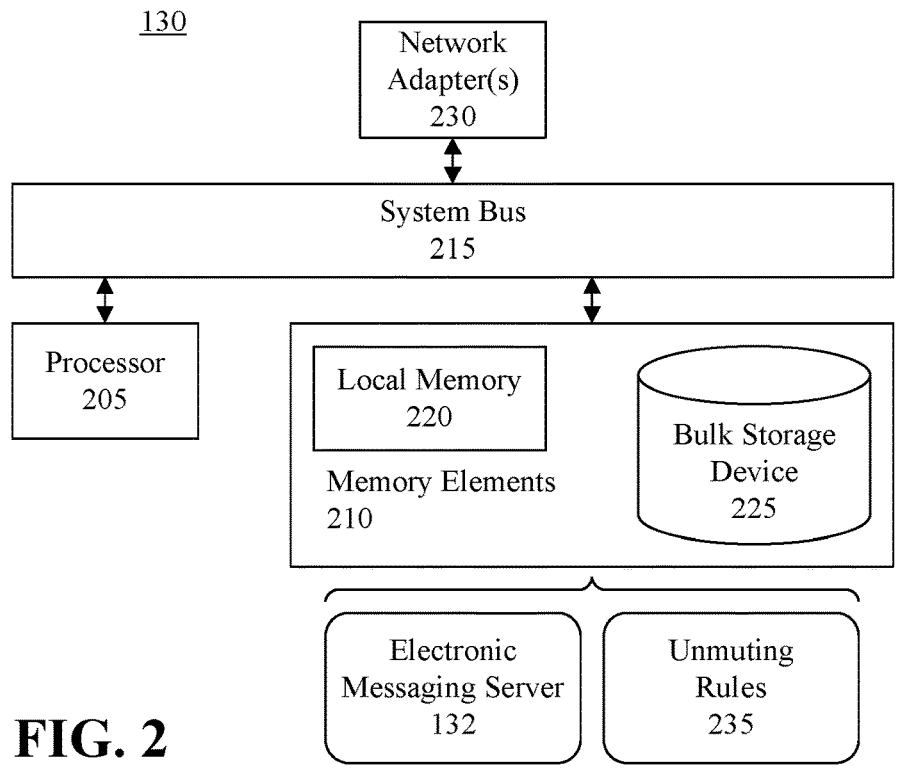
FIG. 2 is a block diagram illustrating example architecture for an electronic messaging system.

FIG. 2 depicts a block diagram of an electronic messaging system 130. The electronic messaging system 130 can include at least one processor 205 (e.g., a central processing unit) coupled to memory elements 210 through a system bus 215 or other suitable circuitry. As such, the electronic messaging system 130 can store program code within the memory elements 210. The processor 205 can execute the program code accessed from the memory elements 210 via the system bus 215. It should be appreciated that the electronic messaging system 130 can be implemented in the form of any system including a processor and memory that is capable of performing the functions and/or operations described within this specification. For example, the electronic messaging system 130 can be implemented as a computer, such as a server, a workstation, a mobile computer, a laptop computer, a tablet computer, and so on.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a HDD, SSD, or other persistent data storage device. The electronic messaging system 130 also can include one or more cache memories (not shown) that provide temporary storage of at least some program code in order to reduce the number of times program code must be retrieved from the bulk storage device 225 during execution.

Input/output (I/O) devices, such as one or more network adapters 230, can be coupled to electronic messaging system 130 to enable the electronic messaging system 130 to become coupled to other systems, computer systems, and/or remote storage devices through intervening private or public networks. Modems, cable modems, transceivers, and Ethernet cards are examples of different types of network adapters 230 that can be used with the electronic messaging system 130. The I/O devices can be coupled to the electronic messaging system 130 either directly or through intervening I/O controllers.

As pictured in FIG. 2, the memory elements 210 can store the components of the electronic messaging system 130, namely the electronic messaging server 132. In an arrangement in which the electronic messaging server 132 is tasked with selectively unmuting conversations, unmuting rules 235 to be processed by the electronic messaging server 132 to selectively unmute conversations also can be stored to the memory elements 310. Further, electronic messages received by and sent by the electronic messaging server 132, and results of data analysis performed by the electronic messaging server 132, can be output to, and stored within, memory elements 210. Being implemented in the form of executable program code, the electronic messaging server 132 can be executed by the electronic messaging system 130 (e.g., by the processor 205) to perform processed described herein. As such, the electronic messaging server 132 can be considered part of the electronic messaging system 130. Moreover, the unmuting rules 235, the electronic messaging server 132, electronic messages received by and sent by the electronic messaging server 132, and results of data analysis performed by the electronic messaging server 132 are functional data structures that impart functionality when employed as part of the electronic messaging system 130.

Figure 3:
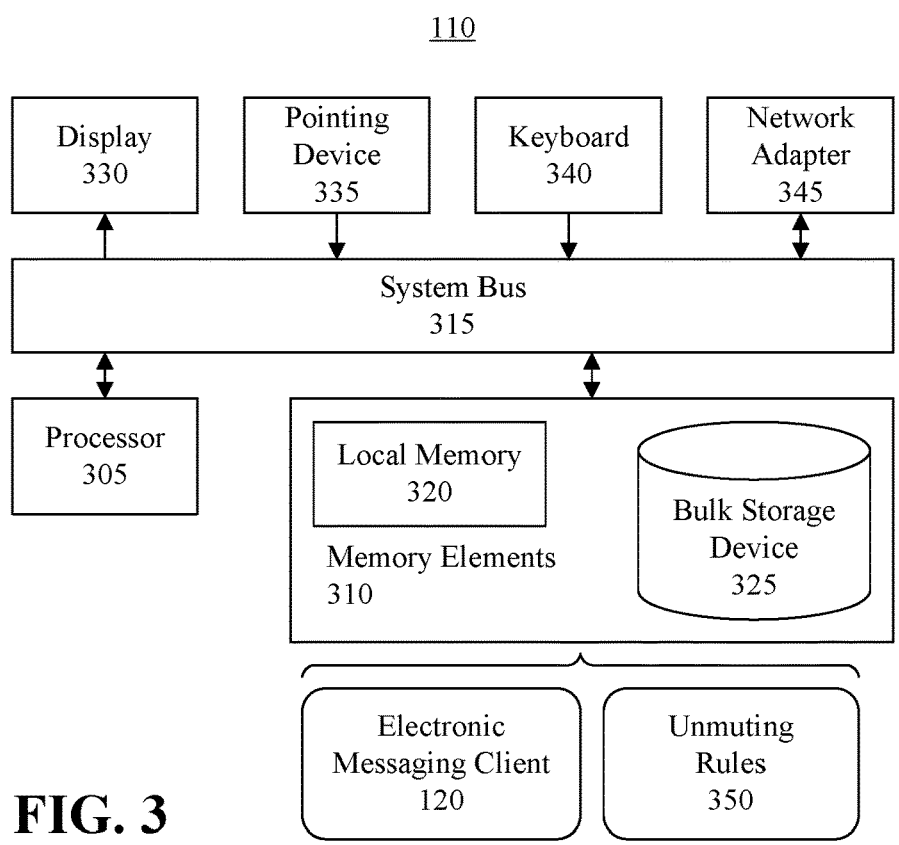
FIG. 3 is a block diagram illustrating example architecture for a client device.

FIG. 3 depicts a block diagram of a client device 110. The client device 110 can include at least one processor 305 (e.g., a central processing unit) coupled to memory elements 310 through a system bus 315 or other suitable circuitry. As such, the client device 110 can store program code within the memory elements 310. The processor 305 can execute the program code accessed from the memory elements 310 via the system bus 315. It should be appreciated that the client device 110 can be implemented in the form of any system including a processor and memory that is capable of performing the functions and/or operations described within this specification.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The client device 110 also can include one or more cache memories (not shown) that provide temporary storage of at least some program code in order to reduce the number of times program code must be retrieved from the bulk storage device 325 during execution.

Input/output (I/O) devices such as a display 330 (or touchscreen) and, optionally, a pointing device 335 and/or a keyboard 340 can be coupled to the client device 110. The I/O devices can be coupled to the client device 110 either directly or through intervening I/O controllers. For example, the display 330 can be coupled to the client device 110 via a graphics processing unit (GPU), which may be a component of the processor 305 or a discrete device. One or more network adapters 345 also can be coupled to client device 110 to enable the client device 110 to become coupled to other systems, computer systems, remote printers, and/or remote storage devices through intervening private or public networks. Modems, cable modems, transceivers, and Ethernet cards are examples of different types of network adapters 345 that can be used with the client device 110.

As pictured in FIG. 3, the memory elements 310 can store the components of the client device 110, namely the electronic messaging client 120. In an arrangement in which the electronic messaging client 120 is tasked with selectively unmuting conversations, unmuting rules 350 to be processed by the electronic messaging client 120 to selectively unmute conversations also can be stored to the memory elements 310. Further, electronic messages received by and sent by the electronic messaging client 120, and results of data analysis performed by the electronic messaging client 120, can be output to, and stored within, memory elements 310. Being implemented in the form of executable program code, the electronic messaging client 120 can be executed by the client device 110 (e.g., by the processor 305) to perform processed described herein. As such, the electronic messaging client 120 can be considered part of the client device 110. Moreover, the unmuting rules 350, electronic messaging client 120, electronic messages received by and sent by the electronic messaging client 120, and results of data analysis performed by the electronic messaging client 120 are functional data structures that impart functionality when employed as part of the client device 110.

Referring again to FIG. 1, in operation, using their respective client devices 110-114, users can participate in a conversation by exchanging messages among one another. At some point, a user of the client device 110 may opt to mute the conversation, for example if the user desires to minimize interruption while focusing on a task. A user interface element (e.g., an icon, button, menu item, or the like) configured to mute the conversation can be presented by the user interface of the client device 110, for example by the electronic messaging client 120, by a web browser or by a mobile application. The user can select the user interface element to mute the conversation. In another arrangement, the user can provide a spoken utterance detected by the client device 110 to mute the conversation.

Responsive to the user selecting the user interface element or providing the spoken utterance, the conversation can be muted by the electronic messaging client 120 and/or the electronic messaging server 132. In the case that the conversation is muted by the electronic messaging server 132, responsive to receiving the user selection of the user interface element or the spoken utterance, the client device 110 can communicate a message to the electronic messaging server 132 to cause the conversation to be muted.

Responsive to the user muting the conversation, the electronic messaging client 120 and/or electronic messaging server 132 can configure the user's electronic message inbox (hereinafter "inbox") to prevent further electronic messages pertaining to the conversation from being visible in the inbox. In this regard, the inbox can be hosted in the electronic messaging client 120 or by the electronic messaging server 132.

Even though the user has muted the conversation, other users may continue sending electronic messages in the conversation which indicate the user as a recipient. The electronic messaging client 120 and/or electronic messaging server 132 can continue to receive the electronic messages sent to the user, but not present the electronic messages in the user's electronic message inbox until either the user unmutes the conversation or the electronic messaging client 120 and/or electronic messaging server 132 determines that the conversation should be unmuted, as described below.

In illustration, while the conversation is muted, another user, for example a user of the client device 114, can send an electronic message 150 to one or more other users, including the user of the client device 110. The user can be indicated in a "To," "Cc," or "Bcc of the electronic message 150, or the user can be a member of a group to which the electronic message 150 is sent. The electronic message 150 can be routed to the user's electronic messaging account (e.g., e-mail account, text messaging account, social networking account, or the like) hosted by the electronic messaging server 132. The electronic messaging client 120 and/or electronic messaging server 132 can store the electronic message 150, but not present the electronic message in the user's inbox until the conversation is unmuted.

Figure 4:
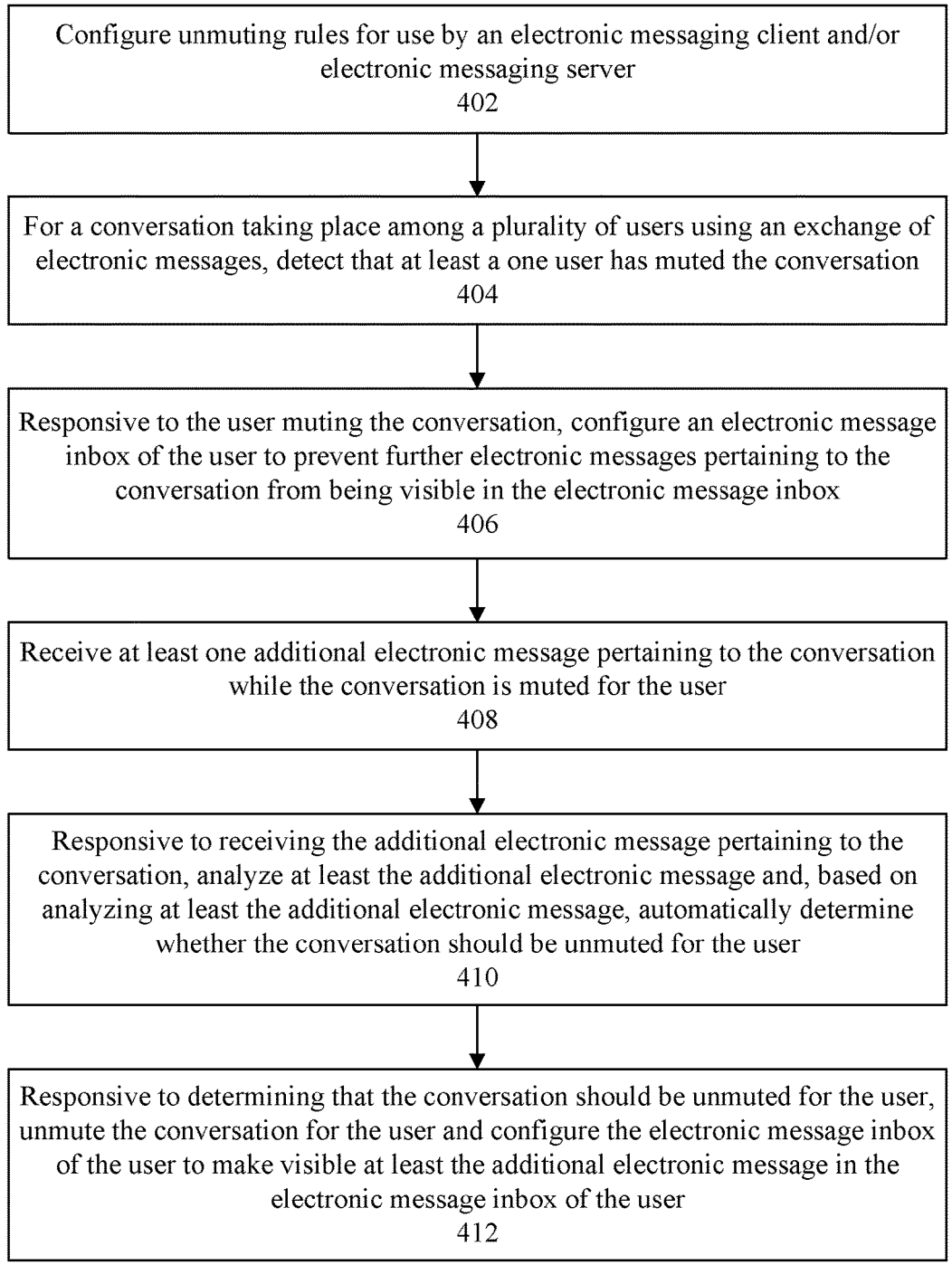
FIG. 4 is a flow chart illustrating an example of a method of selectively unmuting a conversation.

FIG. 4 is a flow chart illustrating an example of a method 400 of selectively unmuting a conversation. As noted, the determination of whether the conversation should be unmuted, and the act of unmuting the conversation, can be performed by the electronic messaging client 120 and/or electronic messaging server 132. Thus, the method 400 can be performed by the client device 110 and/or the electronic messaging system 130.

At step 402, unmuting rules applied by the electronic messaging client 120 and/or electronic messaging server 132 can be configured. For example, a user can configure the unmuting rules by specifying various parameters to be processed to determine whether to unmute a conversation. In illustration, the user can identify terms that are of interest to the user, people who are of interest to the user, etc.

In one arrangement, terms and/or people that are of interest to the user can be automatically identified. For instance, the electronic messaging client 120 and/or electronic messaging server 132 can access a contact list of the user and identify people in the contact list who are indicated as being important contacts to the user. The electronic messaging client 120 and/or electronic messaging server 132 also can access an organizational hierarchy to identify people who are superior to the user in the organizational hierarchy, identify people who are superior to the user in the organizational hierarchy and are indicated in the same branch of the organizational hierarchy as the user, identify in the organizational hierarchy people who directly report to the user, and so on. Other people identified as being of interest to the user can be added as people parameters to the unmuting rules.

Further, terms that are of interest to the user also can be automatically identified. In illustration, the electronic messaging client 120 and/or electronic messaging server 132 can access another system (e.g., a project management system, an artifact management system, a content management system, a requirements management system, an engineering management system, a test management system, etc.) via at least one network to identify elements (e.g., projects, artifacts, links, etc.) with which the user is associated. For example, keywords related to projects to which the user is assigned can be identified, keywords associated with artifacts and/or links created by, edited by, or deleted by the user can be identified, and so on. The keywords identified as being of interest to the user can be added as term parameters to the unmuting rules. Further, keywords oftentimes used by the user in electronic messages also can be identified, and such keywords can be added as keyword parameters to the unmuting rules.

At step 404, for a conversation taking place among a plurality of users using an exchange of electronic messages, the electronic messaging client 120 and/or electronic messaging server 132 can detect that at least one user has muted the conversation. At step 406, responsive to the user muting the conversation, the electronic messaging client 120 and/or electronic messaging server 132 can configure an electronic message inbox of the user to prevent further electronic messages pertaining to the conversation from being visible in the electronic message inbox.

At step 408, the electronic messaging client 120 and/or electronic messaging server 132 can receive at least one additional electronic message pertaining to the conversation while the conversation is muted for the user. At step 410, responsive to receiving the additional electronic message pertaining to the conversation, the electronic messaging client 120 and/or electronic messaging server 132 can analyze at least the additional electronic message and, based on analyzing at least the additional electronic message, automatically determine whether the conversation should be unmuted for the user.

For example, terms contained in the additional electronic message (e.g., subject line, body, etc.) can be compared to keyword parameters and people parameters of the user's unmuting rules. A correlation between a term identifying a keyword, or a person, and a keyword or person parameter of the unmuting rules can indicate that the term (i.e., keyword or person) is of particular interest to the user. Responsive to identifying a correlation between at least one term of the additional electronic message and at least one parameter of the unmuting rules, the electronic messaging client 120 and/or electronic messaging server 132 can determine that the conversation should be unmuted for the user. In one arrangement, the natural language of the additional electronic message and, optionally, other messages in the conversation may be evaluated using natural language processing to analyze message length, structure, content, popularity and/or sentiment to determine whether the conversation should be unmuted.

In another example, user identifiers (e.g., user names, e-mail address, text messaging addresses, etc.) for the sender and/or recipients (i.e., other users) of the additional electronic message can be compared to people parameters of the user's unmuting rules. A sender can be identified by a user identifier in a "From" field of the electronic message and a recipient can be identified by a user identifier in a "To," "Cc" or "Bcc" field of the electronic message. A correlation between a user identifier and a parameter of the unmuting rules can indicate that the other user indicted by the user identifier is of particular interest to the user. Responsive to identifying a correlation between at least one other user and at least one parameter of the unmuting rules, the electronic messaging client 120 and/or electronic messaging server 132 can determine that the conversation should be unmuted for the user.

At step 412, responsive to determining that the conversation should be unmuted for the user, the electronic messaging client 120 and/or electronic messaging server 132 can unmute the conversation for the user and configure the electronic message inbox of the user to make visible at least the additional electronic message in the electronic message inbox of the user.

In one arrangement, unmuting the conversation for the user can include unmuting all of the electronic messages of the conversation or unmuting a subset of electronic messages pertaining to the conversation. The subset of electronic messages can be smaller than a set of electronic messages that includes each of the electronic messages pertaining to the conversation. Thus, even though the conversation may be unmuted, certain electronic messages exchanged in the conversation can remain unmuted. For example, if the additional electronic message is a reply to an earlier message, both the additional electronic message and the earlier electronic message can be unmuted and presented in the user's inbox. In one aspect, if the conversation includes a plurality of different threads, each of the electronic messages in the thread to which the additional electronic message pertains can be unmuted. For instance, if the additional electronic message is a response to an earlier electronic message in a particular thread, each of the other electronic messages in that thread can be unmuted and presented in the user's inbox. At any time, the user can choose to have other electronic messages of the conversation which have remained muted presented in the user's inbox, for example by selecting a suitable user interface element (e.g., icon, button, menu item, etc.).

By way of further example, if a particular user sends an electronic message in response to an earlier electronic message, and that particular user is of particular interest to the user for whom the conversation is being unmuted, the fact that the other user is participating in the conversation can mean that the importance of conversation, or a thread in the conversation, is escalated for the user. By processing the unmuting rules, the electronic messaging client 120 and/or electronic messaging server 132 can identify the escalation of importance, and unmute the conversation as described above. In one non-limiting arrangement, responsive to one or more electronic messages being presented in the user's inbox as a result of the conversation being unmuted, those electronic messages can be presented in the inbox in a manner that distinguishes them from other electronic messages. For example, highlighting can be applied to the electronic messages to distinguish them other electronic messages, the electronic messages can be presented in a particular folder (e.g., important message folder), or the like.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

for a conversation taking place among a plurality of users using an exchange of electronic messages, detecting that at least a first user has muted the conversation;

responsive to the first user muting the conversation, configuring an electronic message inbox of the first user to prevent further electronic messages pertaining to the conversation from being visible in the electronic message inbox;

receiving at least one additional electronic message pertaining to the conversation while the conversation is muted for the first user;

responsive to receiving the additional electronic message pertaining to the conversation, analyzing at least the additional electronic message and, based on analyzing at least the additional electronic message, automatically determining, using a processor, whether the conversation should be unmuted for the first user; and responsive to determining that the conversation should be unmuted for the first user, configuring the electronic message inbox of the first user to make visible at least the additional electronic message in the electronic message inbox of the first user.

2. The method of claim 1, wherein:

analyzing the at least one additional electronic message comprises identifying terms contained in the at least one additional electronic message;

determining whether the conversation should be unmuted for the first user comprises determining whether the at least one additional electronic message contains at least one term that is of particular interest to the first user; and determining that the conversation should be unmuted for the first user is responsive to determining that the at least one additional electronic message contains at least one term that is of particular interest to the first user.

3. The method of claim 2, wherein determining whether the at least one additional electronic message contains at least one term that is of particular interest to the first user comprises determining whether the at least one term identifies a person who is of particular interest to the first user.

4. The method of claim 1, wherein:

analyzing the at least one additional electronic message comprises identifying a second user who generated the at least one additional electronic message;

determining whether the conversation should be unmuted for the first user comprises determining whether the second user is of particular interest to the first user; and determining that the conversation should be unmuted for the first user is responsive to determining that the second user is of particular interest to the first user.

5. The method of claim 4, further comprising:
configuring the electronic message inbox of the first user to make visible the earlier electronic message in the electronic message inbox of the first user.

6. The method of claim 1, wherein:
configuring the electronic message inbox of the first user to make visible at least the additional electronic in the electronic message inbox of the first user comprises highlighting the at least one additional electronic message.

7. The method of claim 1, wherein:
configuring the electronic message inbox of the first user to make visible at least the additional electronic in the electronic message inbox of the first user comprises presenting the at least one additional electronic message in a particular folder of the electronic message inbox.

8. A system, comprising:
a processor programmed to initiate executable operations comprising:
for a conversation taking place among a plurality of users using an exchange of electronic messages, detecting that at least a first user has muted the conversation;
responsive to the first user muting the conversation, configuring an electronic message inbox of the first user to prevent further electronic messages pertaining to the conversation from being visible in the electronic message inbox;
receiving at least one additional electronic message pertaining to the conversation while the conversation is muted for the first user;
responsive to receiving the additional electronic message pertaining to the conversation, analyzing at least the additional electronic message and, based on analyzing at least the additional electronic message, automatically determining whether the conversation should be unmuted for the first user; and
responsive to determining that the conversation should be unmuted for the first user, configuring the electronic message inbox of the first user to make visible at least the additional electronic message in the electronic message inbox of the first user.

9. The system of claim 8, wherein:
analyzing the at least one additional electronic message comprises identifying terms contained in the at least one additional electronic message;
determining whether the conversation should be unmuted for the first user comprises determining whether the at least one additional electronic message contains at least one term that is of particular interest to the first user; and
determining that the conversation should be unmuted for the first user is responsive to determining that the at least one additional electronic message contains at least one term that is of particular interest to the first user.

10. The system of claim 9, wherein determining whether the at least one additional electronic message contains at least one term that is of particular interest to the first user comprises determining whether the at least one term identifies a person who is of particular interest to the first user.

11. The system of claim 8, wherein:
analyzing the at least one additional electronic message comprises identifying a second user who generated the at least one additional electronic message;
determining whether the conversation should be unmuted for the first user comprises determining whether the second user is of particular interest to the first user; and
determining that the conversation should be unmuted for the first user is responsive to determining that the second user is of particular interest to the first user.

12. The system of claim 11, the executable operations further comprising:
configuring the electronic message inbox of the first user to make visible the earlier electronic message in the electronic message inbox of the first user.

13. The system of claim 8, wherein:
configuring the electronic message inbox of the first user to make visible at least the additional electronic in the electronic message inbox of the first user comprises highlighting the at least one additional electronic message.

14. The system of claim 8, wherein:
configuring the electronic message inbox of the first user to make visible at least the additional electronic in the electronic message inbox of the first user comprises presenting the at least one additional electronic message in a particular folder of the electronic message inbox.

15. A computer program product comprising a computer readable storage medium having program code stored thereon, the program code executable by a processor to perform a method comprising:
for a conversation taking place among a plurality of users using an exchange of electronic messages, detecting, by the processor, that at least a first user has muted the conversation;
responsive to the first user muting the conversation, configuring, by the processor, an electronic message inbox of the first user to prevent further electronic messages pertaining to the conversation from being visible in the electronic message inbox;
receiving, by the processor, at least one additional electronic message pertaining to the conversation while the conversation is muted for the first user;
responsive to receiving the additional electronic message pertaining to the conversation, analyzing, by the processor, at least the additional electronic message and, based on analyzing at least the additional electronic message, automatically determining, by the processor, whether the conversation should be unmuted for the first user; and
responsive to determining that the conversation should be unmuted for the first user, configuring, by the processor, the electronic message inbox of the first user to make visible at least the additional electronic message in the electronic message inbox of the first user.

16. The computer program product of claim 15, wherein:
analyzing the at least one additional electronic message comprises identifying terms contained in the at least one additional electronic message;
determining whether the conversation should be unmuted for the first user comprises determining whether the at least one additional electronic message contains at least one term that is of particular interest to the first user; and
determining that the conversation should be unmuted for the first user is responsive to determining that the at least one additional electronic message contains at least one term that is of particular interest to the first user.

17. The computer program product of claim 16, wherein determining whether the at least one additional electronic message contains at least one term that is of particular interest to the first user comprises determining whether the at least one term identifies a person who is of particular interest to the first user.

18. The computer program product of claim 15, wherein:
analyzing the at least one additional electronic message comprises identifying a second user who generated the at least one additional electronic message;
determining whether the conversation should be unmuted for the first user comprises determining whether the second user is of particular interest to the first user; and
determining that the conversation should be unmuted for the first user is responsive to determining that the second user is of particular interest to the first user.

19. The computer program product of claim 18, the method further comprising:
configuring the electronic message inbox of the first user to make visible the earlier electronic message in the electronic message inbox of the first user.

20. The computer program product of claim 15, wherein:
configuring the electronic message inbox of the first user to make visible at least the additional electronic in the electronic message inbox of the first user comprises highlighting the at least one additional electronic message or presenting the at least one additional electronic message in a particular folder of the electronic message inbox.

* * * * *